United States Patent
Kühling et al.

(10) Patent No.: US 6,395,864 B1
(45) Date of Patent: May 28, 2002

(54) POLYCARBONATES WITH A LOW YELLOWNESS INDEX

(75) Inventors: Steffen Kühling, Meerbusch; Rolf Lanze, Krefeld, both of (DE); Michael Prein, Brasschaat (BE); Rainer Neumann, Krefeld (DE); Hermann Kauth, Krefeld (DE); Christian Kords, Krefeld (DE); Frieder Heydenreich, Düsseldorf (DE); Tony van Osselaer, Krefeld (DE); Wilfried Haese, Odenthal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/868,826

(22) PCT Filed: Dec. 10, 1999

(86) PCT No.: PCT/EP99/09774

§ 371 (c)(1),
(2), (4) Date: Jun. 20, 2001

(87) PCT Pub. No.: WO00/39191

PCT Pub. Date: Jul. 6, 2000

(30) Foreign Application Priority Data

Dec. 23, 1998 (DE) .......................... 198 59 692
Dec. 23, 1998 (DE) .......................... 198 59 690
Feb. 4, 1999 (DE) .......................... 199 04 408

(51) Int. Cl.$^7$ .............................................. C08G 64/00
(52) U.S. Cl. ........................ 528/196; 528/198; 428/412
(58) Field of Search ................................. 528/196, 198; 428/412

(56) References Cited

U.S. PATENT DOCUMENTS 5,633,060 A   5/1997   Tokuda et al. ............. 428/64.1

FOREIGN PATENT DOCUMENTS

| DE | 2439552 | | 2/1976 |
| DE | 4227372 | | 4/1993 |
| DE | WO 00/39191 | * | 7/2000 |

OTHER PUBLICATIONS

Database WPI, Section Ch, Week 1993403, Derwent Publications Ltd., London, GB; Class A23, AN 1994–022980, XP002135668 & JP 05 0331277 A (Teijin Chem. Ltd.) Dec. 14, 1993.

* cited by examiner

*Primary Examiner*—Terressa M. Boykin
(74) *Attorney, Agent, or Firm*—Joseph C. Gil; Aron Preis; James R. Franks

(57) ABSTRACT

A process for the preparation of polycarbonate resins having a low yellowness index is described. The process involves converting phosgene with a sodium bisphenolate solution by means of a phase interface process performed with the exclusion of oxygen. The sodium bisphenolate solution used in the process has a dissolved oxygen content of <150 ppb. Also described are optical data storage media prepared from the polycarbonate of the present invention.

12 Claims, No Drawings

POLYCARBONATES WITH A LOW YELLOWNESS INDEX

CROSS REFERENCE TO RELATED PATENT APPLICATIONS

The present patent application claims the right of priority under 35 U.S.C. §119 (a)–(d) and 35 U.S.C. §365 of International Application No. PCT/EP99/09774, filed Dec. 10, 1999, which was published in German as International Patent Publication No. WO 00/39191 on Jul. 6, 2000, which is entitled to the right of priority of German Patent Application Numbers: 198 59 690.1, filed Dec. 23, 1998; 198 59 692.8, filed Dec. 23, 1998; and 199 04 408.2, filed Feb. 4, 1999.

The present invention relates to polycarbonates with low yellowness index (YI) and high transmission (TD) obtainable by the phase interface process, a process for the production thereof, in which sodium bisphenolate solutions with a dissolved oxygen content of <150 ppb are used, a process for the production of such sodium bisphenolate solutions, and substrates for optical data storage media with improved transmission in the blue spectral region.

The synthesis of polycarbonates via the phase interface process is known. The objective is to produce polycarbonates with high transmission which are as colourless as possible. The yellowness index (YI) is a criterion of the inherent coloration of the polycarbonate, the transmission value (TD) a criterion of light transmission. The object of the invention was to provide polycarbonates with as low as possible a YI and a high TD.

It has now been found that such polycarbonates may be obtained when sodium bisphenolate solutions with a dissolved oxygen content of <150 ppb, preferably <100 ppb, particularly preferably <50 ppb are used for the production thereof.

DETAILED DESCRIPTION OF THE INVENTION

The invention therefore provides polycarbonates, obtainable by conversion of phosgene with a sodium bisphenolate solution with a dissolved oxygen content of <150 ppb, preferably <100 ppb, particularly preferably <50 ppb, by the phase interface process, such as is described in DE-OS 42 27 372 for example, with the exclusion of oxygen. In the configurational loop comprising reaction vessel and tubular reactor, recirculating loop and tubular reactors are flooded and the reaction vessel superimposed with nitrogen so that exclusion of oxygen is ensured.

These polycarbonates are particularly suitable for producing optical data storage media, such as compact discs (CDs), magneto-optical discs (MODs) or DVDs which are written or read with short-wave laser light (<500 nm, preferably 400 to 450 nm).

The invention also provides a process for the production of such polycarbonates by the phase interface process, in which phosgene is converted with a sodium bisphenolate solution with a dissolved oxygen content of <150 ppb, preferably <100 ppb, particularly preferably <50 ppb, with exclusion of oxygen.

The invention further provides a process for the production of sodium bisphenolate solutions with a dissolved oxygen content of <150 ppb, preferably <100 ppb, particularly preferably <50 ppb, in which bisphenols with a dissolved oxygen content of <10 ppb are converted with an aqueous NaOH solution with a dissolved oxygen content of <100 ppb with exclusion of oxygen.

Bisphenols which may be used according to the invention are those which are obtainable by conversion of aromatic hydroxy compounds which are not substituted in the p-position and contain no second-order substituents such as cyano, carboxy or nitro groups, for example phenol, o- and m-cresol, 2,6-dimethylphenol, o-tert.-butylphenol, 2-methyl-6-tert.-butylphenol, o-cyclohexylphenol, o-phenylphenol, o-isopropylphenol, 2-methyl-6-cyclopentyl-phenol, o- and m-chlorophenol, 2,3,6-trimethylphenol, preferably phenol, o- and m-cresol, 2,6-dimethylphenol, o-tert.-butylphenol and o-phenylphenol; particularly preferably phenol, and ketones with at least one aliphatic group at the carbonyl function, for example acetone, methylethylketone, methylpropylketone, methylisopropylketone, diethylketone, acetophenone, cyclohexanone, cyclopentanone, methyl, dimethyl and trimethyl cyclohexanones, which may also have geminal methyl groups, e.g. 3,3-dimethyl-5-methylcyclohexanone (hydroisophoron), preferably acetone, acetophenone, cyclohexanone and the homologues thereof having methyl groups; particularly preferably acetone. Intensive nitrogen inertization during the production process ensures that the residual dissolved oxygen content in the bisphenols is less than 10 ppb.

The bisphenols are converted under exclusion of oxygen (nitrogen inertization) with aqueous NaOH solutions which have a dissolved oxygen content of <100 ppb, preferably <20 ppb. The concentration of the aqueous NaOH solution is preferably selected in such a way that the concentration of the resulting sodium bisphenolate solution is as close as possible to the limit of solubility, i.e. in the range from 13 to 16 wt. %, preferably 14 to 15.5 wt. %. The molar ratio of NaOH to bisphenol is 1.8:1 to 2.5:1, preferably 1.9:1 to 2.4:1, particularly preferably 2.0:1 to 2.3:1. The bisphenol may be dissolved in the NaOH as solid although it is preferably added to the NaOH direct as melt without having passed through the solid state so that solutions are obtained with a temperature of 20° C. to 90° C., preferably 30° C. to 70° C.

The aqueous, virtually oxygen-free NaOH used to produce the sodium bisphenolate solution may be produced by electrolysis. Storage and transport of the NaOH after production must take place under inert gas. For use in the process according to the invention the concentration of the NaOH obtained by electrolysis is generally lowered by dilution with virtually oxygen-free, fully demineralized water. The fully demineralized water is freed from oxygen in a manner known in principle, e.g. catalytically, by degassing or stripping with inert gas.

The sodium bisphenolate solutions produced by the process according to the invention have particularly low colour values which naturally also depend on the colour value of the bisphenol used. Where a bisphenol with a colour value of <10 Hz is used, colour values of <1.5 Hz, preferably <1.0 Hz, can be achieved.

The sodium bisphenolate solutions produced by the process according to the invention also exhibit distinctly improved storage stability. A sodium bisphenolate solution having an oxygen content of 20 ppb and stored over 3 hours at 40° C. in inert gas conditions thus exhibits a colour value deterioration of only 0.5 Hz, whereas a colour value deterioration of 3.5 Hz is observed in a solution with an oxygen content of 250 ppb.

The invention further provides the substrates for optical data storage media which may be produced with the polycarbonates according to the invention and the optical data storage media which may be produced from the substrates.

To be able to achieve higher storage densities in optical data storage media, it is intended to replace the read/write systems which have been used hitherto and operate with light in the red spectral region with those which use wavelengths in the blue spectral region, specifically from 400 to 450 nm wavelength. For this purpose the substrates used to produce the optical data storage media are required to exhibit the highest possible transmission in this wavelength range. This is crucial to a good signal-to-noise ratio and a long service life of the data carrier.

It has now been found that substrates with the desired properties may be produced from polycarbonate which was produced using sodium bisphenolate solutions with a dissolved oxygen content of <150 ppb, preferably <100 ppb, particularly preferably <50 ppb.

The invention provides substrates for optical data storage media comprising polycarbonate which is obtainable by conversion of phosgene with a sodium bisphenolate solution with a dissolved oxygen content of <150 ppb, preferably <100 ppb, particularly preferably <50 ppb, by the phase interface process, such as is described in DE-OS 42 27 372 for example, with exclusion of oxygen.

The substrates according to the invention may be produced from homo or copolycarbonates. Bisphenol A polycarbonate or copolymers based on bisphenol A and bisphenol TMC or bisphenol M and bisphenol TMC are preferably used.

In the configurational loop comprising reaction vessel and tubular reactor, recirculating loop and tubular reactors are flooded and the reaction vessel superimposed with nitrogen so that exclusion of oxygen is ensured.

These substrates are used for the production of optical data storage media, such as compact discs (CDs), magneto-optical discs (MODs) or digital versatile discs (DVDs and/or high-density DVDs) which are written and/or read with short-wave laser light (<500 nm, preferably 400 to 450 nm). The invention also provides the optical data storage media produced from the substrates, which media are produced from the substrates in a manner familiar to the person skilled in the art in principle.

In the production of the polycarbonate for the substrates according to the invention, sodium bisphenolate solutions with a dissolved oxygen content of <150 ppb, preferably <100 ppb, particularly preferably <50 ppb, are used, which are obtainable by conversion of bisphenols with a dissolved oxygen content of <10 ppb with an aqueous NaOH solution with a dissolved oxygen content of <100 ppb, with exclusion of oxygen.

Bisphenols which may be used according to the invention are those which are obtainable by conversion of aromatic hydroxy compounds which are not substituted in the p-position and contain no second-order substituents such as cyano, carboxy or nitro groups, for example phenol, o- and m-cresol, 2,6-dimethylphenol, o-tert.-butylphenol, 2-methyl-6-tert.-butylphenol, o-cyclohexylphenol, o-phenylphenol, o-isopropylphenol, 2-methyl-6-cyclopentyl-phenol, o- and m-chlorophenol, 2,3,6-trimethylphenol, preferably phenol, o- and m-cresol, 2,6-dimethylphenol, o-tert.-butylphenol and o-phenylphenol; particularly preferably phenol, and ketones with at least one aliphatic group at the carbonyl function, for example acetone, methylethylketone, methylpropylketone, methylisopropylketone, diethylketone, acetophenone, cyclohexanone, cyclopentanone, methyl, dimethyl and trimethyl cyclohexanones, which may also have geminal methyl groups, e.g. 3,3,5-trimethyl cyclohexanone (hydroisophoron), preferably acetone, acetophenone, cyclohexanone and the homologues thereof having methyl groups; particularly preferably acetone. 1,3-bis[1-(4-hydroxyphenyl)-1-methylethyl]benzene (bisphenol M, CAS No. 13595-25-0) may also be used as bisphenol. The production thereof is described in U.S. Pat. No. 5,633,060. Intensive nitrogen inertization during the production process ensures that the residual dissolved oxygen content in the bisphenols is less than 10 ppb.

The bisphenols are converted under exclusion of oxygen (nitrogen inertization) with aqueous NaOH solutions which have a dissolved oxygen content of <100 ppb, preferably <20 ppb. The concentration of the aqueous NaOH solution is preferably selected in such a way that the concentration of the resulting sodium bisphenolate solution is as close as possible to the limit of solubility, i.e. in the range from 13 to 16 wt. %, preferably 14 to 15.5 wt. %, in the case of bisphenol A. The molar ratio of NaOH to bisphenol is 1.8:1 to 2.5:1, preferably 1.9:1 to 2.4:1, particularly preferably 2.0:1 to 2.3:1. The bisphenol may be dissolved in the NaOH as solid although it is preferably added to the NaOH direct as melt at temperatures of 20° C. to 90° C., preferably 30° C. to 70° C. without having passed through the solid state. Mixtures of different bisphenols may, of course, also be used, such as mixtures of bisphenol A and bisphenol TMC (1,1-bis[4-hydroxyphenyl]-3,3,5-trimethylcyclohexane).

The aqueous, virtually oxygen-free NaOH used to produce the sodium bisphenolate solution may be produced by electrolysis. Storage and transport of the NaOH after production must take place under inert gas. For use in the process according to the invention the concentration of the NaOH obtained by electrolysis is generally lowered by dilution with virtually oxygen-free, fully demineralized water. The fully demineralized water is freed from oxygen in a manner known in principle, e.g. catalytically, by degassing or stripping with inert gas.

The sodium bisphenolate solutions obtained in this way have particularly low colour values which naturally also depend on the colour value of the bisphenol used. Where a bisphenol with a colour value of <10 Hz is used, colour values of <1.5 Hz, preferably <1.0 Hz, can be achieved.

EXAMPLES

The colour values were determined according to ASTM D 1686 by measuring the absorption up to 400 nm over an irradiation path of 50 cm. The yellowness index YI was measured to ASTM D 1925, the transmission to ASTM D 1003. The relative solution viscosity was determined on a solution containing 5 g of polymer/l in dichloromethane at 25° C.

Example 1

To produce 1.022 t/h of a 15% aqueous NaBPA solution, 867.5 kg/h of 6.5% NaOH and 154.5 kg/h of BPA melt are brought together continuously. The entire process is rendered inert with nitrogen. The 6.5% NaOH has an oxygen content of 10 ppb. The Hazen colour value of the resulting 15% aqueous NaBPA is 0.5 Hz. This NaBPA solution is used to produce polycarbonate by the phase interface process. The YI (yellowness index) of the resulting polycarbonate with a relative solution viscosity of 1,200 is 1.45.

Example 2

The NaBPA solution obtained in Example 1 is used to produce a polycarbonate with a relative solution viscosity of 1,315 by the phase interface process. The YI (yellowness index) of the resulting polycarbonate is 2.2.

Example 3

To produce 1.022 t/h of a 15% aqueous NaBPA solution, 867.5 kg/h of 6.5% NaOH and 154.5 kg/h of BPA melt are brought together continuously. The entire process is rendered inert with nitrogen. The 6.5% NaOH has an oxygen content of 100 ppb. The Hazen colour value of the resulting 15% aqueous NaBPA is 1.3 Hz. This NaBPA solution is used to produce polycarbonate by the phase interface process. The YI (yellowness index) of the resulting polycarbonate with a relative solution viscosity of 1,200 is 1.75.

Example 4

The NaBPA solution obtained in Example 3 is used to produce a polycarbonate with a relative solution viscosity of 1,315 by the phase interface process. The YI (yellowness index) of the resulting polycarbonate is 2.5.

Example 5

To produce 1.022 t/h of a 15% aqueous NaBPA solution, 867.5 kg/h of 6.5% NaOH and 154.5 kg/h of BPA melt are brought together continuously. The entire process is rendered inert with nitrogen. The 6.5% NaOH has an oxygen content of 150 ppb. The Hazen colour value of the resulting 15% aqueous NaBPA is 1.9 Hz. This NaBPA solution is used to produce polycarbonate by the phase interface process. The YI (yellowness index) of the resulting polycarbonate with a relative solution viscosity of 1,200 is 1.85.

Example 6

The NaBPA solution obtained in Example 5 is used to produce a polycarbonate with a relative solution viscosity of 1,315 by the phase interface process. The YI (yellowness index) of the resulting polycarbonate is 2.7.

Reference Example 7

To produce 1.022 t/h of a 15% aqueous NaBPA solution, 867.5 kg/h of 6.5% NaOH and 154.5 kg/h of BPA melt are brought together continuously. The entire process is rendered inert with nitrogen. The 6.5% NaOH has an oxygen content of 200 ppb. The Hazen colour value of the resulting 15% aqueous NaBPA is 1.9 Hz. This NaBPA solution is used to produce polycarbonate by the phase interface process. The YI (yellowness index) of the resulting polycarbonate with a relative solution viscosity of 1,200 is 1.9.

Reference Example 8

The NaBPA solution obtained in Reference example 7 is used to produce a polycarbonate with a relative solution viscosity of 1,315 by the phase interface process. The YI (yellowness index) of the resulting polycarbonate is 2.8.

Reference Example 9

To produce 1.022 t/h of a 15% aqueous NaBPA solution, 867.5 kg/h of 6.5% NaOH and 154.5 kg/h of BPA melt are brought together continuously. The entire process is rendered inert with nitrogen. The 6.5% NaOH has an oxygen content of 250 ppb. The Hazen colour value of the resulting 15% aqueous NaBPA is 2 Hz. This NaBPA solution is used to produce polycarbonate by the phase interface process. The YI (yellowness index) of the resulting polycarbonate with a relative solution viscosity of 1,200 is 1.90.

Reference Example 10

The NaBPA solution obtained in Reference example 9 is used to produce a polycarbonate with a relative solution viscosity of 1,315 by the phase interface process. The YI (yellowness index) of the resulting polycarbonate is 2.8.

Example 11

The NaBPA solution obtained in Example 1 is used to produce a polycarbonate with a relative solution viscosity of 1,297 which has be en coloured blue by addition of a few ppm of blue or violet organic colorants, by the phase interface process. The light transmission (transmission, ASTM D 1003) of the resulting polycarbonate is 87.95%.

Example 12

The NaBPA solution obtained in Example 3 is used to produce a polycarbonate with a relative solution viscosity of 1,297 which has been coloured blue (addition of identical quantities and colorants as in Example 11), by the phase interface process. The light transmission (transmission, ASTM D 1003) of the resulting polycarbonate is 87.66%.

Example 13

The NaBPA solution obtained in Example 5 is used to produce a polycarbonate with a relative solution viscosity of 1,297 which has been coloured blue (addition of identical quantities and colorants as in Example 11), by the phase interface process. The light transmission (transmission, ASTM D 1003) of the resulting polycarbonate is 87.43%.

Reference Example 14

The NaBPA solution obtained in Reference example 7 is used to produce a polycarbonate with a relative solution viscosity of 1,297 which has been coloured blue (addition of identical quantities and colorants as in Example 11), by the phase interface process. The light transmission (transmission, ASTM D 1003) of the resulting polycarbonate is 87.40%.

Reference Example 15

The NaBPA solution obtained in Reference example 9 is used to produce a polycarbonate with a relative solution viscosity of 1,297 which has been coloured blue (addition of identical quantities and colorants as in Example 6), by the phase interface process. The light transmission (transmission, ASTM D 1003) of the resulting polycarbonate is 87.32%.

FIG. 1 shows how the colour value of the NaBPA solution and the transparency and YI of the polycarbonates depend on the oxygen content.

Example 16

To produce 1.272 t/h of an aqueous solution of sodium bisphenolate and the disodium salt of 1,1-bis-(4-hydroxyphenyl)-3,3-dimethyl-5-methylcyclohexane (57 mol. %:43 mol. %), 79.35 kg/h of 1,1-bis-(4-hydroxyphenyl)-3,3-dimethyl-5-methyl cyclohexane (freed of residual oxygen before the dissolution process in an agitated vessel by five-fold evacuation and filling with nitrogen) are dissolved with 487.4 kg/h of 6.5% NaOH with exclusion of oxygen and mixed with a solution of 102.3 kg/h of BPA (BPA as melt is continuously brought together with NaOH) in 603.4 kg/h of 6.5% NaOH with exclusion of oxygen. The 6.5% NaOH used has an oxygen content of 10 ppb. The Hazen colour value of the resulting aqueous sodium bisphenolate solution is 0.9 Hz.

This Na bisphenolate solution is used to produce a copolycarbonate by the phase interface process. The Y.I. (yellowness index) of the resulting copolycarbonate with a relative solution viscosity of 1,295 is 2.4.

Example 17

To produce 1.272 t/h of an aqueous solution of sodium bisphenolate and the disodium salt of 1,1-bis-(4-hydroxyphenyl)-3,3-dimethyl-5-methylcyclohexane (57 mol. %:43 mol. %), 79.35 kg/h of 1,1-bis-(4-hydroxyphenyl)-3,3-dimethyl-5-methyl cyclohexane (freed of residual oxygen before the dissolution process in an agitated vessel by five-fold evacuation and filling with nitrogen) are dissolved with 487.4 kg/h of 6.5% NaOH with exclusion of oxygen and mixed with a solution of 102.3 kg/h of BPA (BPA as melt is continuously brought together with NaOH) in 603.4 kg/h of 6.5% NaOH with exclusion of oxygen. The 6.5% NaOH used has an oxygen content of 100 ppb. The Hazen colour value of the resulting aqueous sodium bisphenolate solution is 1.2 Hz.

This Na bisphenolate solution is used to produce a copolycarbonate by the phase interface process. The Y.I. (yellowness index) of the resulting copolycarbonate with a relative solution viscosity of 1,295 is 2.7.

Reference Example 18

To produce 1.272 t/h of an aqueous solution of sodium bisphenolate and the disodium salt of 1,1-bis-(4-hydroxyphenyl)-3,3-dimethyl-5-methylcyclohexane (57 mol. %:43 mol. %), 79.35 kg/h of 1,1-bis-(4-hydroxyphenyl)-3,3-dimethyl-5-methyl cyclohexane (freed of residual oxygen before the dissolution process in an agitated vessel by five-fold evacuation and filling with nitrogen) are dissolved with 487.4 kg/h of 6.5% NaOH with exclusion of oxygen and mixed with a solution of 102.3 kg/h of BPA (BPA as melt is continuously brought together with NaOH) in 603.4 kg/h of 6.5% NaOH with exclusion of oxygen. The 6.5% NaOH used has an oxygen content of 250 ppb. The Hazen colour value of the resulting aqueous sodium bisphenolate solution is 1.8 Hz.

This Na bisphenolate solution is used to produce a copolycarbonate by the phase interface process. The Y.I. (yellowness index) of the resulting copolycarbonate with a relative solution viscosity of 1,295 is 3.4.

Example 19

The sodium bisphenolate solution obtained in Example 16 is used to produce a copolycarbonate with a relative solution viscosity of 1,293 which has been coloured blue by addition of a few ppm of blue or violet organic colorants, by the phase interface process. The light transmission (transmission, ASTM D 1003) of the resulting polycarbonate is 88.30%.

Example 20

In a manner similar to Example 19 the sodium bisphenolate solution obtained in Example 17 is used to produce a copolycarbonate with a relative solution viscosity of 1,294 which has been coloured blue by addition of a few ppm of blue or violet organic colorants, by the phase interface process. The light transmission (transmission, ASTM D 1003) of the resulting polycarbonate is 87.9%.

Reference Example 21

In a manner similar to Example 19 the sodium bisphenolate solution obtained in Reference example 18 is used to produce a copolycarbonate with a relative solution viscosity of 1,296 which has been coloured blue by addition of a few ppm of blue or violet organic colorants, by the phase interface process. The light transmission (transmission, ASTM D 1003) of the resulting polycarbonate is 87.0%.

The more highly heat resistant copolycarbonates produced in Examples 16, 17, 19 and 20 are particularly suitable for the production of external and internal diffusers for motor vehicle reflectors in which good light transmission is a crucial requirement.

Example 22

To produce 1.022 t/h of a 15% aqueous NaBPA solution, 867.5 kg/h of 6.5% NaOH and 154.5 kg/h of BPA melt are brought together continuously. The entire process is rendered inert with nitrogen. The 6.5% NaOH has an oxygen content of 10 ppb. The Hazen colour value of the resulting 15% aqueous NaBPA is 0.5 Hz. This NaBPA solution is used to produce polycarbonate by the phase interface process.

Reference Example 23

To produce 1.022 t/h of a 15% aqueous NaBPA solution, 867.5 kg/h of 6.5% NaOH and 154.5 kg/h of BPA melt are brought together continuously. The entire process is rendered inert with nitrogen. The 6.5% NaOH has an oxygen content of 250 ppb. The Hazen colour value of the resulting 15% aqueous NaBPA is 2 Hz. This NaBPA solution is used to produce polycarbonate by the phase interface process.

Example 24

A polycarbonate with tert.-butylphenol terminal groups and an average viscosity number of 40 (measured to ISO 1628-1) was produced from the NaBPA solution obtained in Example 22. With a permissible processing moisture of 0.01% this polycarbonate was injection-moulded on a Netstal Discjet 600 type CD injection moulding machine to produce CD blanks with a thickness of 1.2 mm and an external diameter of 120 mm. A bright mould with no pit structure was used.

The granules were processed into CD blanks at different machine settings:

| Setting 1 Cylinder temperatures: | | | |
|---|---|---|---|
| Feed | Compression | Cylinder head | Nozzle |
| 315° C. | 320° C. | 320° C. | 320° C. |

Maximum injection speed: 130 mm/sec.

Tool (starting temperature): 55° C.
Cycle time: 4.6 sec.

| Setting 2 Cylinder temperatures: | | | |
|---|---|---|---|
| Feed | Compression | Cylinder head | Nozzle |
| 315° C. | 340° C. | 350° C. | 350° C. |

Maximum injection speed: 110 mm/sec.

Tool (starting temperature): 55° C.
Cycle time: 4.9 sec.

On setting 2, CDs were also produced after the machine had been stopped for 5 minutes, during which the machine setting was not altered. The third disc after the injection moulding machine had been started up again was removed for the measurements. This test setting is denoted in the Tables as Setting 2 (5 minute machine stoppage).

| Setting 3 Cylinder temperatures: | | | |
|---|---|---|---|
| Feed | Compression | Cylinder head | Nozzle |
| 315° C. | 360° C. | 380° C. | 380° C. |

Maximum injection speed: 100 mm/sec.

Tool (starting temperature): 55° C.

Cycle time: 5.5 sec.

The CD blanks obtained were then subjected to a colorimetric assessment. The measurement takes place in the region of the CD on the radius 40 mm. The following methods of measurement were involved:

1. Transmission (based on ASTM E 308/ASTM D 1003 standards) Equipment: Pye-Unicam (measurement geometry: 0°/diffuse, calculated according to illuminant C.)
2. Yellowness index YI to ASTM E 313

Reference Example 25

A polycarbonate with tert.-butylphenol terminal groups and an average viscosity number of 40 (measured to ISO 1628-1) was produced from the NaBPA solution obtained in Reference Example 23.

The results obtained in Example 24 and Reference example 25 are summarized in the Tables below:

TABLE 1

| Transmission according to Setting 1 (320° C.) | | | | | | |
|---|---|---|---|---|---|---|
| Wavelength (nm) | 400 | 410 | 420 | 430 | 440 | 450 |
| Example 24 | 88.18 | 88.47 | 88.72 | 88.89 | 89.09 | 89.24 |
| Reference example 25 | 87.98 | 88.29 | 88.57 | 88.78 | 89.00 | 89.15 |

TABLE 2

| Transmission according to Setting 2 (350° C.) | | | | | | |
|---|---|---|---|---|---|---|
| Wavelength (nm) | 400 | 410 | 420 | 430 | 440 | 450 |
| Example 24 | 88.28 | 88.56 | 88.81 | 88.98 | 89.18 | 89.31 |
| Reference example 25 | 87.93 | 88.26 | 88.52 | 88.75 | 88.95 | 89.09 |

TABLE 3

| Transmission according to Setting 2 (5 mins. machine stoppage) | | | | | | |
|---|---|---|---|---|---|---|
| Wavelength (nm) | 400 | 410 | 420 | 430 | 440 | 450 |
| Example 24 | 87.74 | 88.13 | 88.46 | 88.70 | 88.92 | 89.08 |
| Reference example 25 | 87.51 | 87.92 | 88.26 | 88.53 | 88.76 | 88.93 |

TABLE 4

| Transmission according to Setting 3 (380° C.) | | | | | | |
|---|---|---|---|---|---|---|
| Wavelength (nm) | 400 | 410 | 420 | 430 | 440 | 450 |
| Example 24 | 88.15 | 88.46 | 88.75 | 88.97 | 89.14 | 89.28 |
| Reference example 25 | 87.93 | 88.27 | 88.57 | 88.81 | 89.00 | 89.14 |

TABLE 5

| Yellowness index | | | | |
|---|---|---|---|---|
| Setting | 1 (320° C.) | 2 (350° C.) | 2 (350° C./ 5 mins) | 3 (380° C.) |
| Example 24 | 0.85 | 0.83 | 1.01 | 0.87 |
| Reference example 25 | 0.96 | 0.95 | 1.13 | 0.97 |

The results show that CDs produced according to the invention have higher transmission values in the blue spectral region, 400 to 450 nm wavelength, and lower yellowness index values than the reference CDs.

The CDs according to the invention thus have a better signal-to-noise ratio in the wavelength range from 400 to 450 nm, which is of great importance to optical data storage media which are written or read with short-wave laser light. The service life of the CD is also greater because of the lower light absorption of the material.

What is claimed is:

1. A polycarbonate prepared by a process comprising, converting phosgene with a sodium bisphenolate solution by means of a phase interface process with exclusion of oxygen, wherein said sodium bisphenolate solution has a dissolved oxygen content of <150 ppb.

2. A process for the production of a polycarbonate comprising, converting phosgene with a sodium bisphenolate solution, by means of a phase interface process with exclusion of oxygen, wherein said sodium bisphenolate solution has a dissolved oxygen content of <150 ppb.

3. A process for the production of sodium bisphenolate solutions having a dissolved oxygen content of <150 ppb, comprising, converting, with exclusion of oxygen, (i) bisphenols having a dissolved oxygen content of <10 ppb with (ii) an aqueous NaOH solution having a dissolved oxygen content of <100 ppb.

4. A substrate for optical storage media comprising, a polycarbonate which is prepared by a process comprising, converting phosgene with a sodium bisphenolate solution, by means of a phase interface process with exclusion of oxygen, wherein said sodium bisphenolate solution has a dissolved oxygen content of <150 ppb.

5. An optical data storage media comprising the polycarbonate of claim 1.

6. A method of using the polycarbonate of claim 1 comprising producing an optical data storage medium substrate therefrom.

7. A process for the production of sodium bisphenolate solutions that contain less than 150 ppb of dissolved oxygen comprising reacting while excluding oxygen, at least one bisphenol that contains less than 10 ppb of dissolved oxygen with an aqueous NaOH solution that contains less than 100 ppb of dissolved oxygen.

8. The sodium bisphenolate prepared by the process of claim 7.

9. A method of making polycarbonate comprising reacting, in the absence of oxygen, phosgene with the sodium bisphenolate of claim 8.

10. The polycarbonate prepared by the method of claim 9.

11. An optical date storage medium comprising the polycarbonate of claim 10.

12. An optical date storage medium comprising the polycarbonate of claim 9.

* * * * *